April 17, 1928.

R. C. ALLEN 1,666,521

THRUST BEARING

Filed June 17, 1925

WITNESSES:

R.C.Allen
INVENTOR

BY

ATTORNEY

Patented Apr. 17, 1928.

1,666,521

UNITED STATES PATENT OFFICE.

ROBERT C. ALLEN, OF SWARTHMORE, PENNSYLVANIA, ASSIGNOR TO WESTINGHOUSE ELECTRIC & MANUFACTURING COMPANY, A CORPORATION OF PENNSYLVANIA.

THRUST BEARING.

Application filed June 17, 1925. Serial No. 37,711.

My invention relates to thrust bearings, particularly to thrust bearings of the tilting shoe or segmental type and it has for an object to provide apparatus of the character designated which shall have embodied therein facilities for equitably distributing the total thrust between the several segments or shoes. It has for a further object to provide a thrust distributing or equalizing mechanism which shall operate freely and with a minimum amount of resistance against the movement of its parts.

Figure 1:
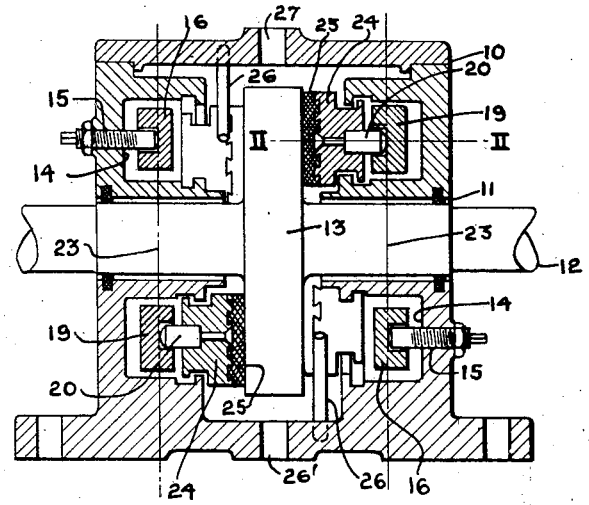
Figure 2:
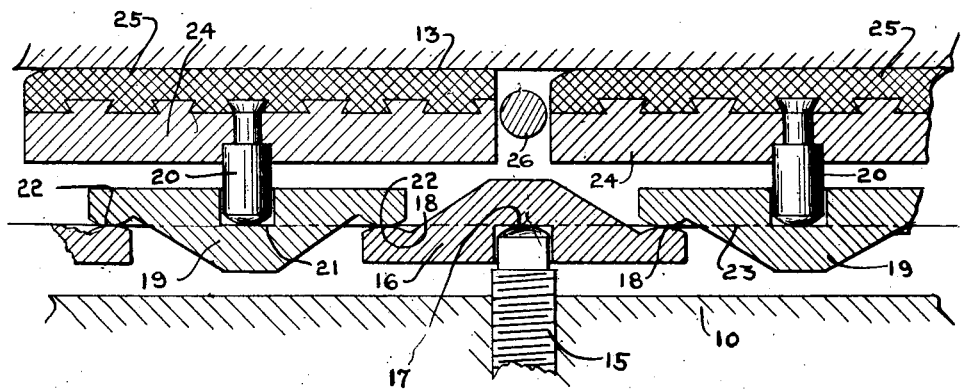

These and other objects, which will be made apparent throughout the further description of my invention, may be attained by the employment of the apparatus hereinafter set forth and illustrated in the accompanying drawing in which Fig. 1 is a view, in sectional elevation, of one form of my improved thrust bearing and Fig. 2 is a partial plan view, in section, taken on the line II—II of Fig. 1, and showing a development, into a plane relationship, of a plurality of thrust shoes together with their associated load distributing mechanism.

In thrust bearings of the tilting shoe or segmental type, such as illustrated in U. S. Patent No. 1,361,073 to Albert Kingsbury, it is very necessary that the total thrust be equally divided or distributed between the several bearing shoes. One method which has been found to be especially effective consists in employing a series of conjoined and inter-related tilting levers, which levers distribute the load and also transmit the thrust from the rotating thrust collar to the stationary bearing housing. As shown in the above patent, the equalizing levers heretofore employed have been fulcrumed alternately in the vicinity of the bearing shoe and upon the walls of the housing, their cooperating or engaging surfaces being arranged in a plane intermediate the fulcrum points. As a consequence of this arrangement, considerable sliding movement must necessarily take place between adjacent levers in order to permit the proper tilting required by the equalizing process. Owing to the fact that these equalizing levers transmit the thrust from the thrust collar to the housing, considerable frictional resistance is offered to this sliding movement and it is possible that relative movements of the levers may be opposed to such an extent as to cause greatly increased loads to be momentarily thrown upon a single or only a small number of the bearing shoes. It is obvious that such a condition may seriously endanger the life of the bearing and the safety of the associated structure.

I have therefore conceived the idea of so arranging the equalizing mechanism that the fulcrum points of the respective levers, as well as their cooperating or engaging surfaces, are located in substantially a single plane. In this way, the amount of sliding movement required to take place between adjacent levers is reduced to a minimum and the frictional resistance to freedom of movement materially lessened.

Referring to the drawing for a detailed description of my invention, I show in Fig. 1 a stationary housing 10 which is provided with an opening 11 through which a rotatable shaft 12 extends, the latter being provided with a thrust collar 13. Secured in the lateral walls 14 of the housing are a plurality of fixed circumferentially spaced pins 15 which freely support the respective equalizing levers 16, as shown in Fig. 2. The equalizing levers 16 are each provided with a central bearing portion 17 and arcuate end portions 18—18. The clearances provided between the central bearing portions of the respective levers 16 and the pins 15 are large enough to permit flexibility of movement of the levers but are sufficiently small to retain them within desired limits.

Supported upon the end portions 18, between adjacent equalizing levers, are bridging members 19, each member being provided with a central bearing portion 21 and arcuate end portions 22—22. The central bearing portions 17 and 21 as well as end portions 18 and 22 of the levers 16 and the bridging members 19 are arranged in a common plane as indicated at 23. Freely and pivotally supported upon the bearing 21 of each bridging member 19, as by pins 20, are respective segmental thrust shoes 24, each of which is preferably provided with a bearing metal surface 25 arranged contiguous to the thrust collar 13. Some suitable means, such as pins 26, are provided in the housing 10 for preventing circumferential displacement of the thrust shoes 24 and the bridging members 19. The working clearances provided between the pins 20 and 26 and the bridging members 19 and the thrust shoes 24 respectively are large enough to permit the required relative movement therebetween but are sufficiently small to retain the various parts within desired limits. Lubrication of the bearing may be effected in numerous ways and I have shown, for purposes of illustrations, an oil inlet 26' located in the lower portion of the bearing and an oil outlet 27 located in the upper portion.

In operation, the thrust exerted by the shaft 12 in either axial direction is transmitted through the shoes 24, the pins 20, the bridging members 19, the equalizing levers 16 and the pins 15 to the housing 10. The equalizing levers 16 and the bridging members 19 are free to pivot or wobble so as to perform their function of equalizing or equally distributing the total thrust between the several bearing shoes 24.

It is to be noted that the annularly arranged system of overlapping and interbearing levers and bridging members constitute, in effect, a substantially continuous flexible equalizing ring which can operate to provide equal pressure engagement between the bearing shoes 24 and the collar 13 and thus compensate for any accidental angular displacement of the collar 13 with respect to the housing 10. The segments 24 can also turn or flex transversely or radially and thereby permit the bearing surfaces to tilt in radial planes independently of given movement between the shoes and the bridging members 19. The bearing shoes may therefore tilt circumferentially of the housing to form wedge shaped oil films in accordance with the well-known principles of the Kingsbury bearing.

It is apparent from the drawing that my pressure-equalizing mechanism is so arranged as to offer a minimum amount of opposition to the movement of its parts for the reason that the fulcrum points and the engaging surfaces of the various levers are arranged in a common plane whereby the amount of sliding movement required to take place between cooperating levers is reduced to a minimum. It is apparent that I have therefore made a distinct advance in the thrust bearing art by the invention of an equalizing mechanism which operates easier and more freely than similar mechanisms heretofore employed and which consequently effects more accurate load distribution and greater operating reliability of the entire bearing.

While I have described my invention as pertaining to bearings in which the segmental thrust shoes are arranged in the form of a circle, nevertheless it is to be understood that my invention may also be applied to bearings of the segmental type in which the bearing shoes are arranged through only a portion of a complete circle or in which they are arranged in either a straight line or some irregular form.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claim.

What I claim is:

In a thrust bearing the combination of a thrust collar; a supporting member spaced from and in opposed relation with respect to the collar; an annular series of segmental shoes engaging said collar; a pivot projection carried by each shoe and extending toward said supporting member; a plurality of pivot projections carried by the supporting member and arranged alternately with respect to the pivot projections of the shoes and extending toward said collar; all of said pivot projections having their pivot ends tangent to a common normal plane; a first series of rocker members, each of which has an intermediate depressed seat engaging a pivot projection on the supporting member and a pair of rocker bearing portions facing said collar, the rocker bearing portions of the members of the first series being arranged laterally of the seats thereof and tangent to said common normal plane; and a second series of rocker members, each of which has an intermediate depressed seat engaging a pivot projectiton of a shoe and a pair of rocker bearing portions facing said supporting member, the rocker bearing portions of the members of the second series being arranged laterally of the seats thereof and tangent to said common normal plane; the rocker bearing portions of the members of the second series being in overlapping relation with respect to the rocker bearing portions of the members of the first series and the overlapping rocker bearing portions being in rocking engagement.

In testimony whereof, I have hereunto subscribed my name this eighth day of June, 1925.

ROBERT C. ALLEN.